Sept. 11, 1923.

N. A. LYBECK

FISHING BOAT

Filed June 22, 1917        8 Sheets-Sheet 5

Inventor
Nels A. Lybeck
By his Attorney
Jas. H. Griffin

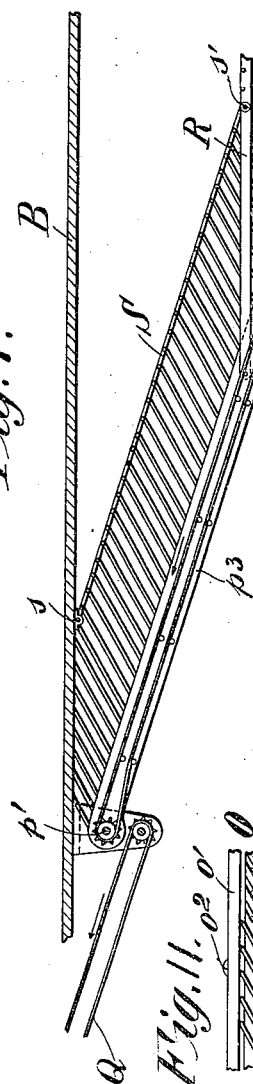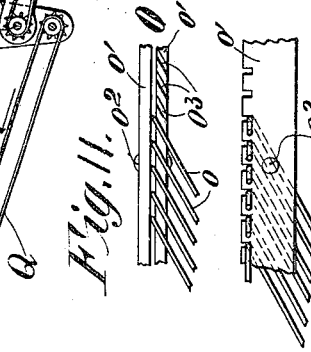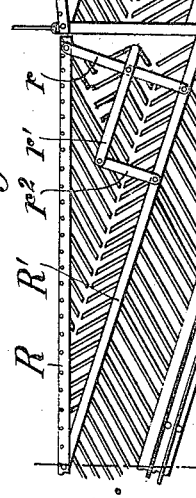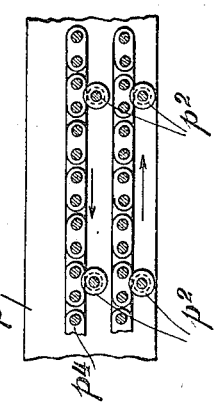

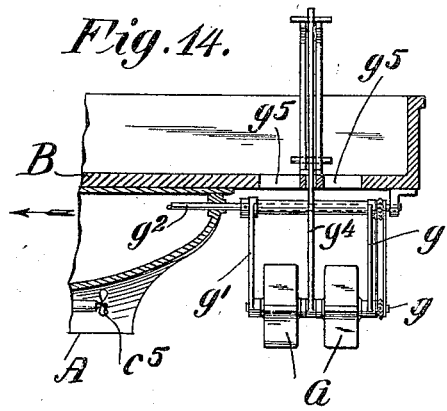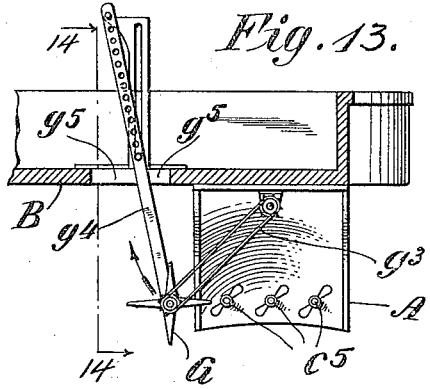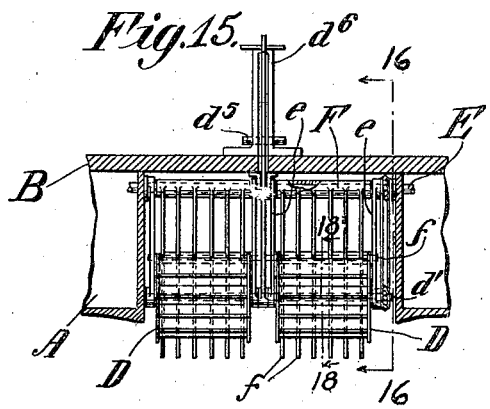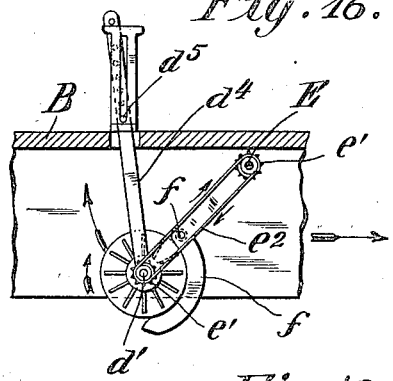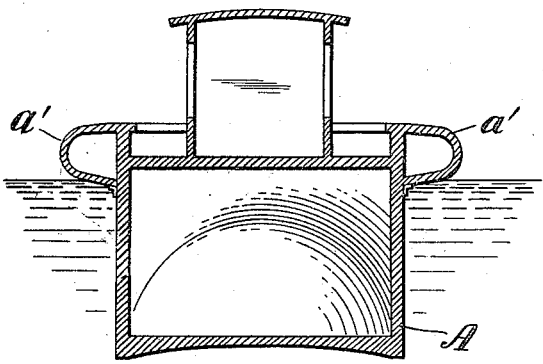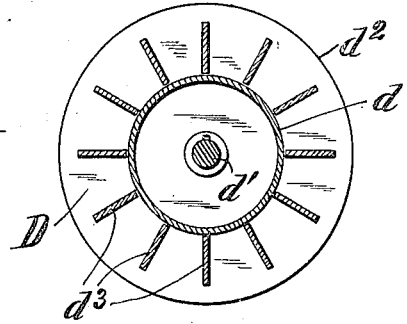

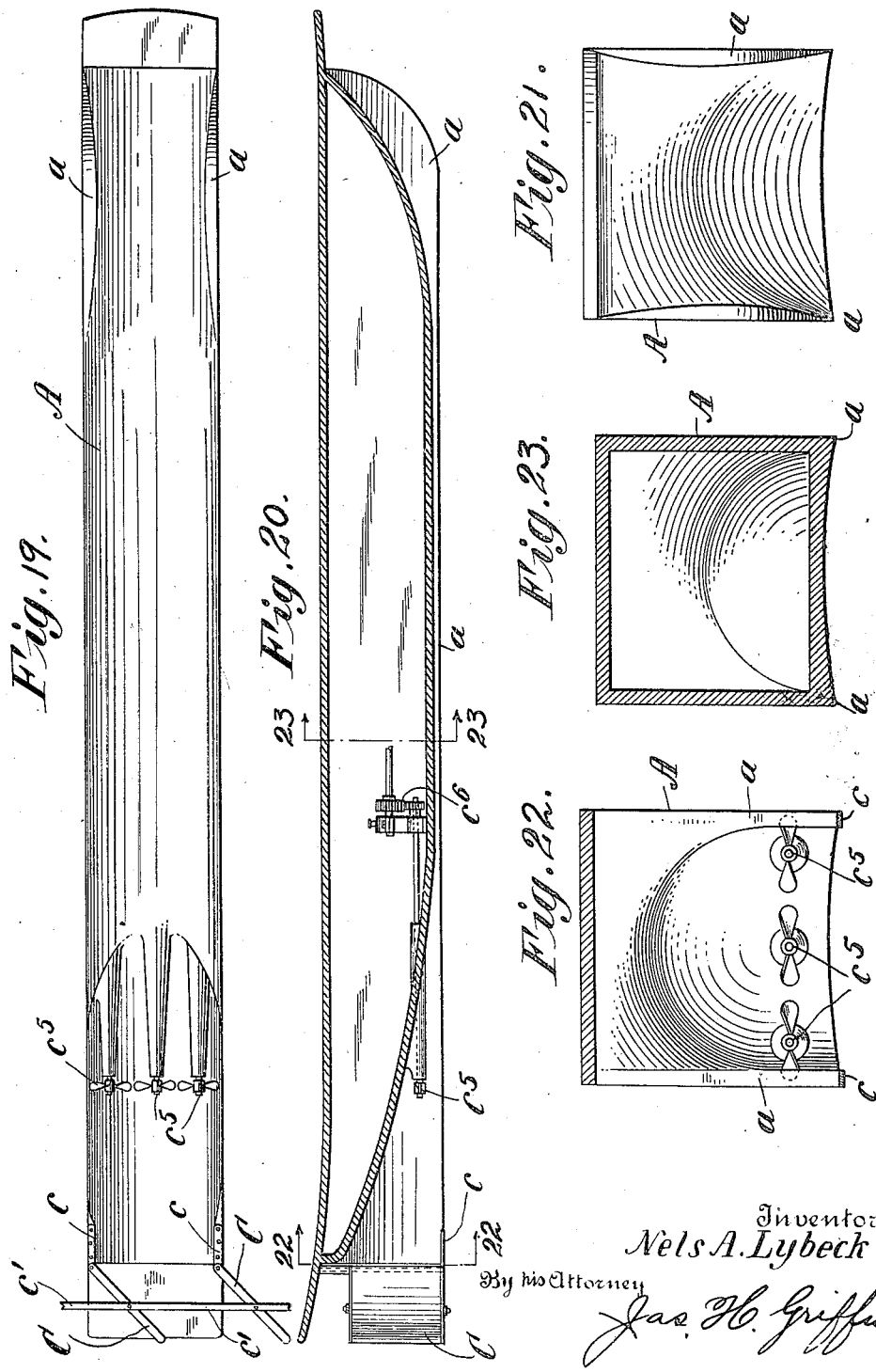

Patented Sept. 11, 1923.

1,467,763

UNITED STATES PATENT OFFICE.

NELS A. LYBECK, OF BROOKLYN, NEW YORK.

FISHING BOAT.

Application filed June 22, 1917. Serial No. 176,274.

*To all whom it may concern:*

Be it known that I, NELS A. LYBECK, a citizen of the United States, residing in the city of New York, borough of Brooklyn, county of Kings, and State of New York, have invented a certain new and useful Fishing Boat, of which the following is a specification.

This invention is a fishing boat and is directed to improvements in the method and means of fishing. The chief objects of the invention, though not exclusive, may be briefly enumerated as follows: first, to provide improved means for propelling the vessel in both forward and lateral directions, and improved means for guiding the vessel during such operations; second, means for collecting the fish in the vessel's path and conveying them to the deck, with which means is associated further means for precluding the choking of the conveying means; third an improved construction of network or screen from which the fish collecting means is mainly formed, which network or screen is so constructed as to furnish minimum resistance to the flow of water through the meshes or interstices of said network or screen; and fourth, means for regulating the depth of submersion of the fish collecting means, and means associated with the fish collecting means for precluding the nose thereof from digging into the ocean bottom when operating in shallow waters.

A further feature of the invention resides in an improved method of fishing at night, which consists in attracting the fish, through the employment of strong searchlights, into a zone forward of the boat and in the path thereof, collecting said fish as the boat travels along, and elevating the fish thus collected within the boat.

Features of the invention, other than those specified, as well as the advantages thereof, will be apparent from the hereinafter detailed description taken in conjunction with the accompanying drawings.

In the accompanying drawings I have illustrated different practical embodiments of the invention, but the constructions shown therein are to be understood as illustrative only, and not as defining the limits of the invention.

Figures 7 and 7$^a$ are central sections of the preferred form of fish collecting means, Figure 7$^a$ illustrating the forward portion of said means, while Figure 7 illustrates the rear portion thereof, said Figure 7 being on an enlarged scale in the interest of clearness. It is to be understood that Figure 7$^a$ is a continuation of the construction shown in Figure 7.

Figure 8 is an enlarged detail section on the line 10—10 of Figure 7$^a$.

Figure 9 is a similar detail section on the line 9—9 of Figure 8.

Figure 10 is a detail plan of a form of netting or fishbone screen element which I prefer to employ, and which is adapted to render the least resistance to the passage of the same through water.

Figure 11 is a view similar to that of Figure 10, illustrating a slightly modified form of fishbone construction.

Figure 12 is an elevation of the construction shown in Figure 11, one part being removed for the sake of clearness.

Figure 1:
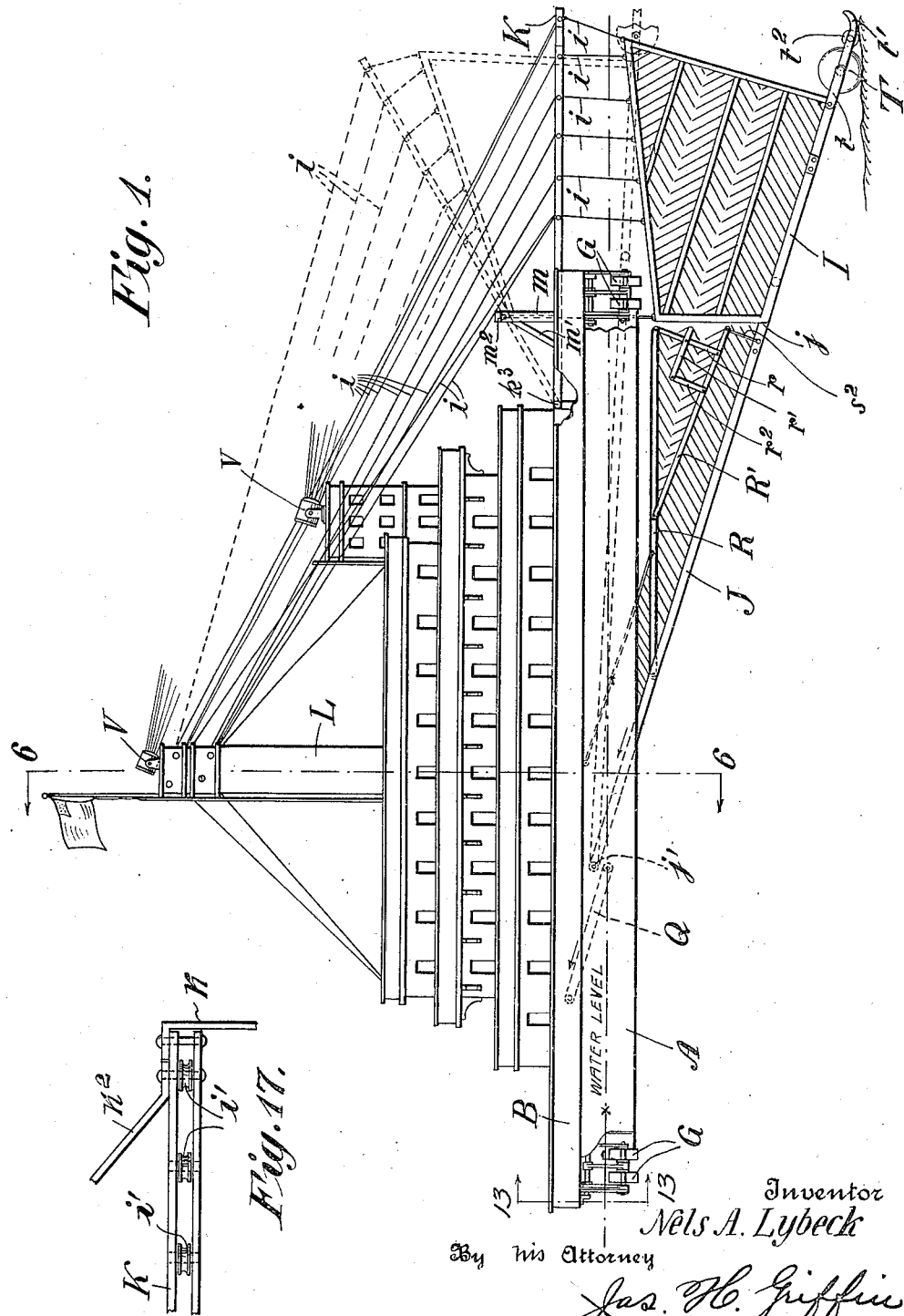
Figure 1 is a side elevation of a fishing boat embodying the present invention.

Figure 13 is a fragmental section of the vessel shown in Figures 1 to 6, inclusive, said section being taken on the line 13—13 of Figure 1.

Figure 14 is a section taken longitudinally of one of the hulls, as on the line 14—14 of Figure 13.

Figure 3:
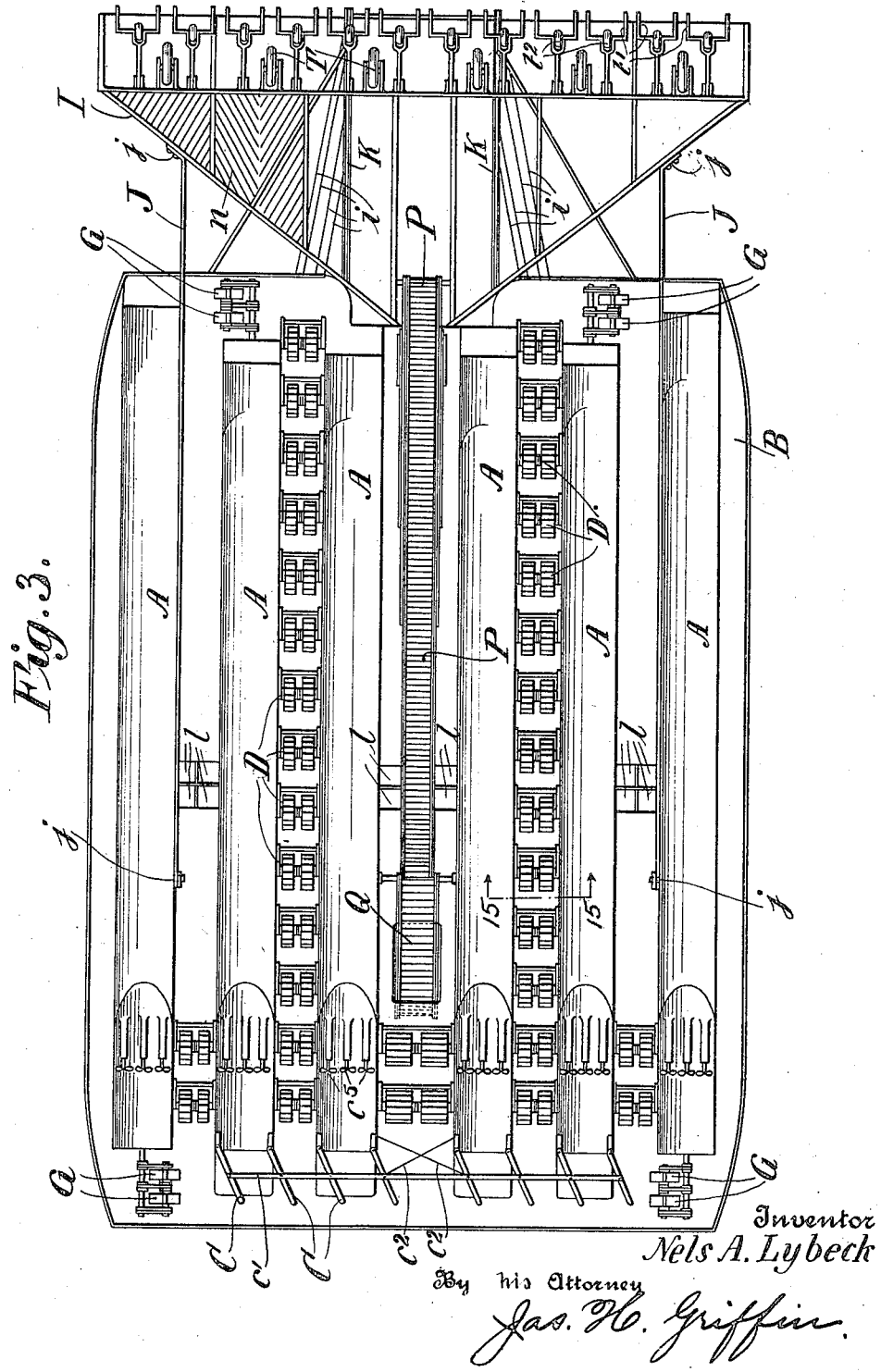
Figure 3 is a bottom plan of the boat shown in Figure 1.
Figure 4:
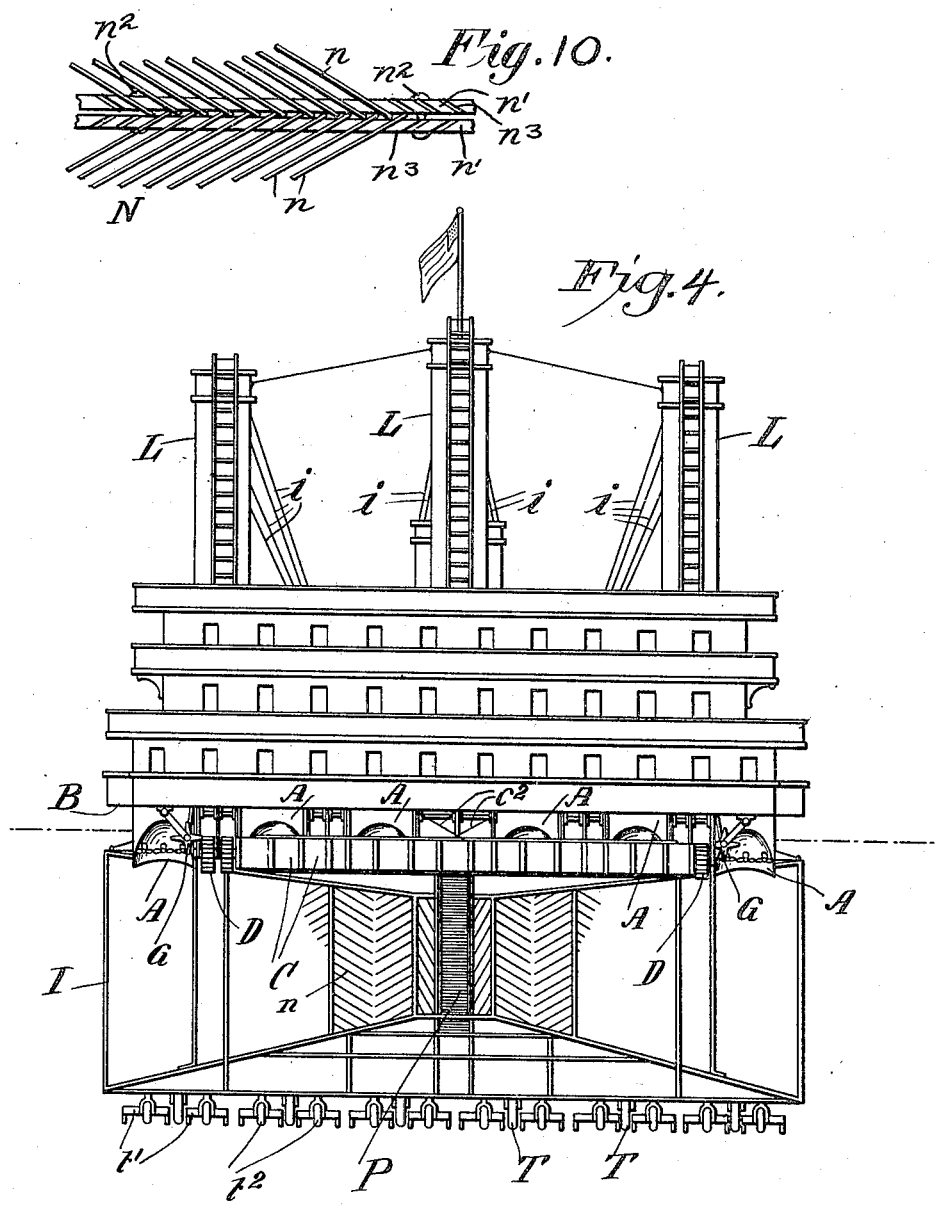
Figure 4 is a rear elevation of the boat.

Figure 15 is a section on the line 15—15 of Figure 3, showing certain paddle-wheels in front elevation.

Figure 16 is a section on line 16—16 of Figure 15.

Figure 17 is a plan view of the outer end of one of the booms which are utilized to support the fish collecting means.

Figure 18 is a detail section through one of the paddle-wheels, as on the line 18—18 of Figure 15.

Figure 19 is an underneath plan view of a single hull boat embodying novel features of the present invention.

Figure 20 is a substantially central, vertical, longitudinal section through the boat of Figure 19.

Figure 21 is a front elevation of the boat of Figures 19 and 20.

Figure 22 is a section on the line 22—22 of Figure 20.

Figure 23 is a transverse section on the line 23—23 of Figure 20, and

Figure 24 is a section similar to that of Figure 23, but showing a modified form of construction embodying sponsons.

Figure 6:
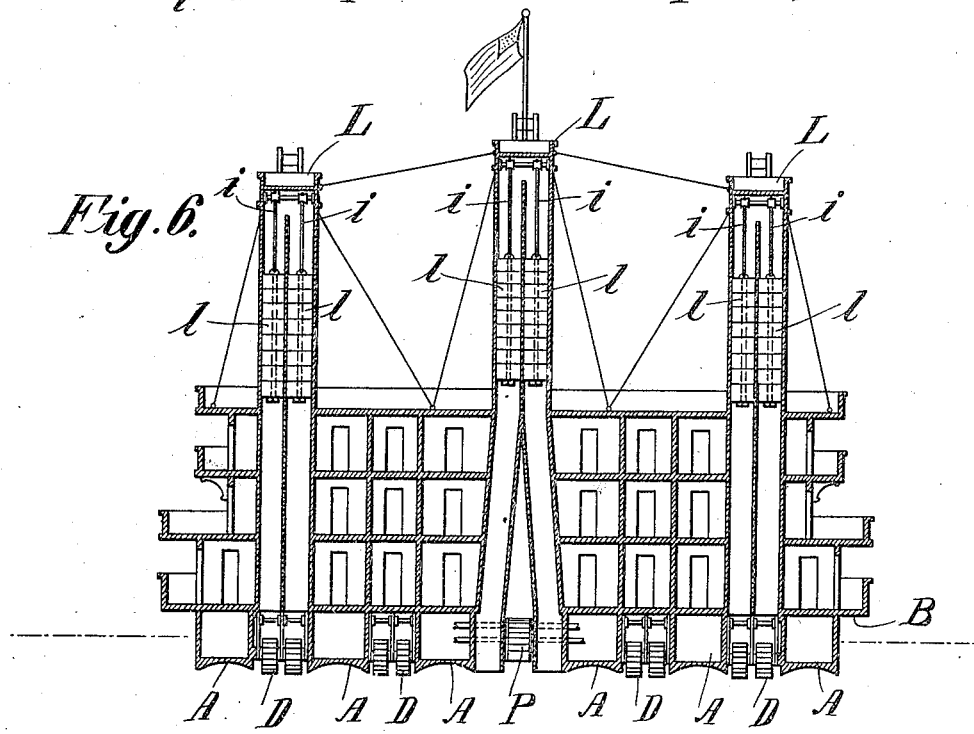
Figure 6 is a transverse section through the vessel, taken in the vertical plane of the line 6—6 of Figure 1.

Referring to the drawings, A designates a plurality of hulls positioned in parallel relation, side by side, beneath a common deck B, which extends over all of the hulls and, preferably, has a slight overhang at the sides, bow and stern thereof, as clearly shown in Figures 3 and 6. All of the hulls are built alike and are of the general construction shown in Figures 19 to 23, inclusive. Each has substantially straight, perpendicular sides, but is generally dory-shaped in central, longitudinal section. The sides of the hull drop sheer and terminate in substantially even keels $a$, extending for practically the entire length of the hull. The inner section of such formations provides a hull, the under side of which is channeled longitudinally, there being a relatively deep channel at the bow and stern, as shown best in Figures 20, 21 and 22, and a relatively shallow channel mid-ships, as shown in Figure 23. Extending rearwardly of each of the four center keels of the boat is a rudder C, which is supported at its lower end on the usual skeg $c$, the rudder post extending upwardly and being journaled for oscillation in the deck. It is essential that these two rudders incline in either one direction or the other at the same angle, i. e., operate in parallel relation at all times, and, in order to assure this, they are preferably connected together intermediate their ends by a rigid link $c'$. If a plurality of hulls A are positioned side by side as shown in Figure 3, the link $c'$ is made to extend across all of the rudders, so that, when one rudder is operated, all the remaining rudders are simultaneously moved therewith so as to be maintained in parallel relation at all times.

There are various ways in which the rudders may be operated, but I prefer to use the general arrangement illustrated in Figure 3, wherein rudder operating ropes or chains $c^2$ are secured to the link $c'$ and extend into the boat to be operated by any suitable steering means.

The improved channeled hull of this invention may be used in a single hull or a multi-hull boat, and in either case said hulls may be separately propelled through one or more propeller blades $c^5$ driven through suitable connections $c^6$, as shown in Figure 20. When the channeled hull construction is used in a single hull boat intended to be employed in very rough waters, the hull may be equipped with sponsons $a'$ as shown in Figure 24, although these may be dispensed with if desired.

When a plurality of hulls of the type described are mounted beneath a common deck, as shown in Figures 3 and 6, said hulls may be propelled separately or independently through the propellers $c^5$ as described, or additional propelling means may be employed. I desire the boat of this invention to be driven at a good rate of speed and, accordingly, additional propelling means is provided so that the desired speed may be obtained. This means is shown in the form of a plurality of paddle-wheels D, a series of which are positioned in a row between adjacent hulls, as shown in Figure 3. Any number of these paddle-wheels may be employed, but, for the purposes of illustration, two sets are shown as extending from substantially the bow to the stern, between two pairs of hulls, while others are shown positioned in tandem between the remaining pairs of hulls. When a plurality of paddle-wheels are employed, one behind the other, so that the entire series extend from the bow to the stern, the consecutive paddle-wheels considered from bow to stern should be driven at constantly increasing speeds. That is to say, if the first paddle-wheel is to make 100 R. P. M., the second wheel should make a greater number of revolutions, e. g., 110 or 120 R. P. M., and the third paddle-wheel should make 130 or 140 R. P. M., etc. These figures are, of course, only illustrative, but will serve to make the operation clear, since, if all of the paddle-wheels operated at the same speed, there would be such a rapid rush of water between the hulls, set up by the first few wheels, that the remaining wheels would have no function.

Details of the preferred form of paddle-wheel are shown in Figures 15, 16 and 18. Each paddle-wheel D has a hollow hub $d$, built in the form of a hollow, air-tight cylinder through which extends a driven shaft $d'$ rigidly keyed to the ends of the hub. The opposite ends of the hub are provided with flanges $d^2$, and extending radially from the outer periphery of the hub are spaced paddle-blades $d^3$, as best shown in Figure 18, the opposite ends of the blades being, preferably, rigidly secured to the flanges $d^2$. The driven shaft $d'$ is mounted for oscillation on a pair of arms $e$, through the other ends of which is passed a drive shaft E (see Figures 15 and 16). Drive shaft E is driven from suitable mechanism positioned within one or both of the adjacent hulls, and rotary movement is transmitted from drive shaft E to driven shaft $d'$ through sprocket $e'$ and cooperating sprocket chain $e^2$. With this construction, it will appear that, since the hub $d$ of the paddle-wheel is air-tight, it will be buoyant and will preclude the paddle-wheel from becoming entirely submerged. In practice, substantially only half of the wheel extends below the surface of the water, and, through the mounting of the wheel on swinging arms $e$, said wheel is allowed, at all times, to adjust itself to the water level, which, manifestly, changes in accordance with the load on the boat. It may be desirable at times to raise paddle-wheel D out of the water, and to this end an elevating link $d^4$ is secured at its lower end to driven shaft $d'$ and extends upwardly through the deck B of the boat. By the manipulation of a pin $d^5$, cooperating with link $d^4$ and associated with a guide $d^6$, the paddle-wheel, after being raised as desired, may be precluded from descending beyond a predetermined point.

In order that the paddle-wheel may not be fouled by flotsam, ice, etc., driving shaft E preferably passes through a tubular sleeve F, on which are rigidly mounted a plurality of protecting ribs $f$ which extend for a short distance in parallel relation to swinging arms $e$ and, for the remainder of their extents, conform to the outer circumference of the paddle-wheel, as shown in Figure 16. A rod $f'$ passes through all of these protecting ribs and is anchored at its ends in the swinging arms $e$, so as to maintain the ribs in proper guarding position forward of the paddle-wheel. Thus, whenever the paddle-wheel is in operative position, said ribs serve as fenders to protect the paddle-blades $d^3$ against injury.

It is frequently desirable to employ paddle-wheels of the character described as twins, and a method of very economically accomplishing this is shown in Figure 15, wherein two paddle-wheels D are mounted, side by side, on a common driven shaft $d'$ and actuated from a common drive shaft E, a single suspension link $d^4$ serving to retain both wheels elevated, when this is desired. The two paddle-wheels mounted as shown in Figure 15 will operate as a unit and in substantially the same manner as one alone, except that more propelling power will be derived. The driving of the paddle-wheels may be accomplished in any desirable way through suitable shafting or direct connections with a plurality of motors or engines, but it is not considered necessary to show these details as mechanism for driving paddle-wheels is well known and forms no part of the present invention.

In docking a multi-hull boat of the character described, all the appurtenances hereinafter enumerated for carrying out the fishing operation may render the boat somewhat unwieldy, and it is, therefore, preferred to provide means for facilitating the handling of the boat in close quarters. To this end, I provide a plurality of lateral propellers G fore and aft, the placements of which are shown in Figure 3, the details of the same being illustrated in Figures 13 and 14. The lateral paddle-wheels G are preferably operated as twins, being mounted on a common driven shaft $g$, which is supported for oscillation on swinging arm $g'$ pivotally secured to a driving shaft $g^2$, extending fore and aft and driven from suitable mechanism within the hull. Movement is transmitted from driving shaft $g^2$ to driven shaft $g$ through a sprocket chain $g^3$, and the paddle-wheel may be raised or lowered as desired through link connections $g^4$, corresponding to the link connections $d^4$ of the propelling paddle-wheels D. Lateral paddle-wheels G, however, differ in construction from paddle-wheels D in that each of the former preferably embody but four blades, as shown in Figure 15, so that, when the operation of these paddle-wheels is not desired, they may be elevated whereby one of the blades of each paddle-wheel extends through a slot $g^5$ in the deck, while the two adjacent blades are maintained in face-abutting engagement with the under side of the deck. In this manner, the paddle-wheels G may be lifted clear of the water, so as not to impede the forward progress of the boat during its normal operations. However, when it is desired to dock the boat, paddle-wheels G may be lowered to operative position within the water and actuated as desired to warp the boat laterally up to the dock.

The means for propelling the boat laterally performs, also, another important function in the practical operation of the boat. In the event the boat is traveling forward, and a school of fish is sighted comparatively close to the boat, but laterally of the line of direction of the boat, it is important that the boat be capable of being moved quickly in a lateral direction, in order that it may meet the school directly or head on. Accordingly, the means for propelling the boat laterally enables this result to be accomplished. It is thus apparent that such means cooperates with the other elements in lending efficiency to the structure as a whole.

Figure 2:
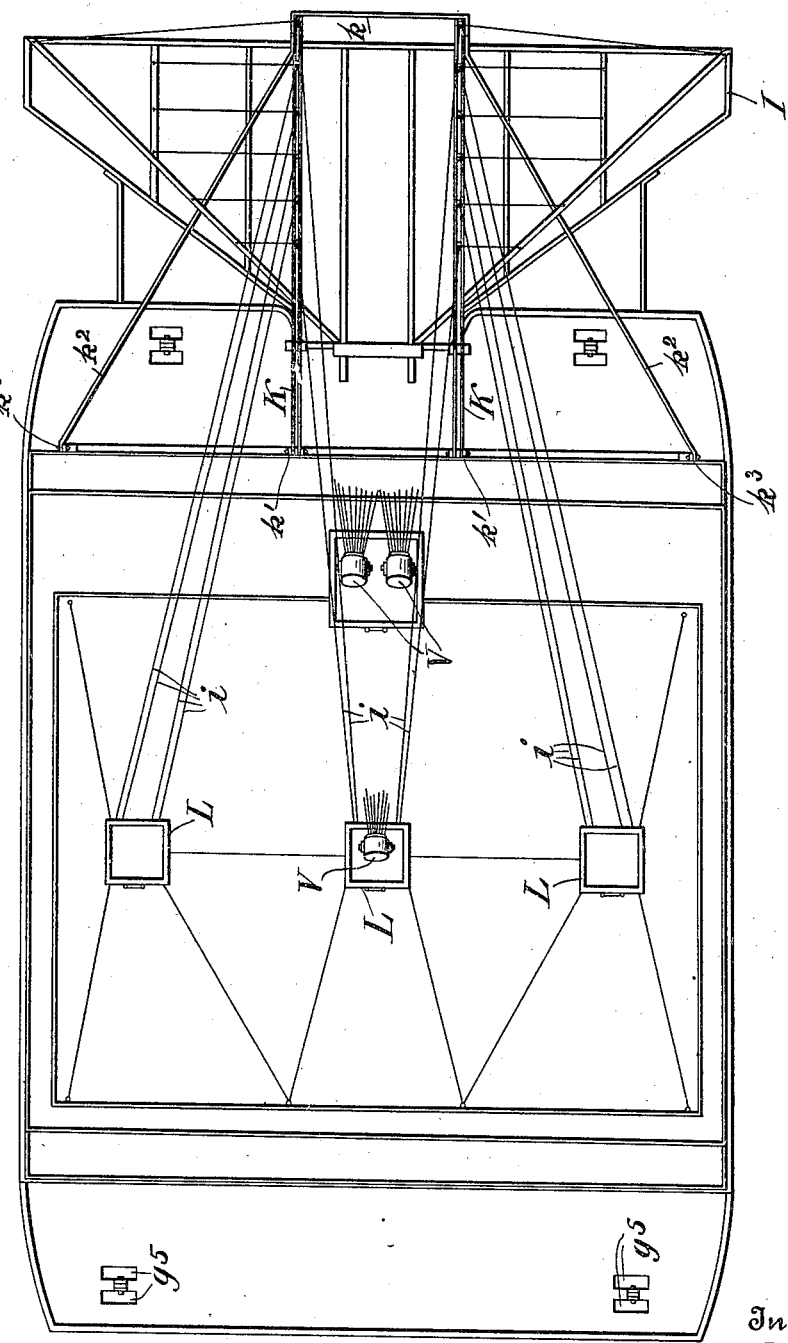
Figure 2 is a top plan thereof.

As shown best in Figures 1 to 4, inclusive, there is positioned forwardly and beneath the boat a scoop member I which, in its preferred embodiment, is substantially in the form of a rectangular funnel, the larger, open end of which faces forwardly of the boat. The scoop I, as shown in the drawings, is in the form of a skeleton frame which is mounted on the boat by means of long links J rigidly secured to the frame at $j$, extending rearwardly beneath the boat, and pivoted to the sides of the two outer hulls, as at $j'$, just aft of midships, as shown best in Figures 1 and 3, so that the scoop may be submerged or lowered to a lesser or greater depth through the oscillation of said scoop on the links J operating about pivots $j'$. The scoop is normally suspended, at a proper depth, on a plurality of hoisting cables $i$, which are laid over sheaves $i'$, supported by a pair of booms K, as shown best in Figures 1, 2 and 5. The booms are maintained in proper, spaced relation at their outer ends by a rigid spacing connection $k$, and are pivoted at their inner ends, as at $k'$, to the main deck of the boat. Said booms are also braced against lateral swinging movement by means of lateral braces $k^2$ secured at their forward ends to the forward ends of the booms and also pivoted to the main deck of the boat, as at $k^3$, all of the pivots $k'$ and $k^3$ being in alinement so that the boom, with its accessories, is free to oscillate about a common axis (see Figures 1 and 2). The hoisting cables $i$ pass from the sheaves $i'$ upwardly and aft to the top of three hollow masts L positioned substantially midships, and said hoisting cables are divided equally among the masts, as shown in Figure 2. Within the hollow masts are vertical guideways for weights $l$ to which the ends of the several hoisting cables are secured. The ponderosity of the weights $l$ is so figured that they will counter-balance the portion of the scoop to which each hoisting cable is secured, so that, by the conjoint operations of all the cables and cooperating weights, the scoop I is properly counter-balanced. It will be noted from Figure 6 that the guides for the weights extend downwardly and are open through the deck to the water. This construction is provided so that, if any of the weights become detached, they will fall clear into the sea and will not break out the bottom of the boat.

Figure 5:
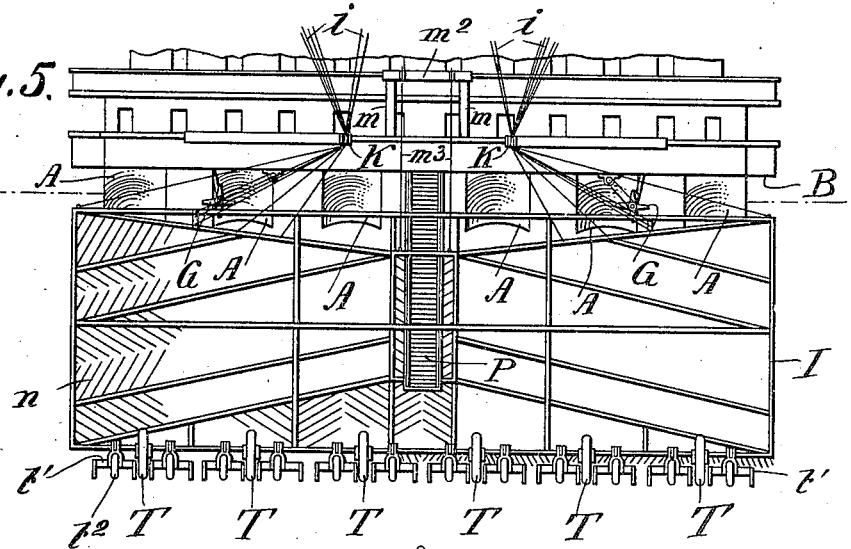
Figure 5 is a front elevation, showing the fish collecting means, the hulls and part of the upper works.

With this substantially counter-balanced arrangement of the parts, it will take very little power to raise the scoop from the full line position of Figure 1, wherein it is submerged in the water, to the dotted line position there shown, where the scoop is raised out of the water. This may be accomplished in many ways, but, for the purposes of illustration, I have shown at the front of the main deck two upright stanchions $m$ properly braced, as at $m'$, and supporting at their tops a cross-beam $m^2$, said structure serving, in effect, the purpose of a rigid gin-pole by means of which the scoop may be raised or lowered through the agency of cables $m^3$, as shown in Figure 5. These cables $m^3$ may be operated manually or mechanically through pulley-blocks, or may run through snatch-blocks and be carried interior of the boat to a suitable hoisting drum. In either instance, the scoop may be raised or lowered, at will, through the application of comparatively little power.

As heretofore stated, the scoop is skeletonized or built up structurally, and the open parts between the struts, uprights, and other structural elements, are closed by a netting or mesh which will allow of the discharge of water through the walls of the scoop, but will preclude the exit of fish collected therein. I have found, through long experience, that the well known crisscross or square mesh commonly used in fish-nets offers a great resistance to the passage of water, this being evident from the fact that such a net can only be dragged through the water through the application of considerable power. If a net of this character were employed in the scoop described, it would set up such resistance that it would be impossible to propel the boat through the water at the comparatively high rate of speed with which it is preferred to operate, and I have, accordingly, devised, after much experiment, an improved netting, forming part of this invention, as shown in the drawings.

This netting simulates an ordinary fish bone, as is evident from the detailed showings of Figures 10, 11 and 12. Netting N as shown in Figure 10, is formed by clamping the ends of wires $n$ between two parallel strips $n'$ and riveting or bolting said strips together by bolts or rivets $n^2$ to hold said ends of the wires tightly between the strips. The upper edges of the strips are provided with oblique grooves $n^3$, and those portions of the wires which extend beyond the outer margins of said edges are bent down and into said grooves so that, when the construction is completed, the construction bears a marked resemblance to the backbone of a fish. The oblique notches in strips $n'$ are staggered so that the wires extending through the notches of one strip will alternate with the wires extending through the notches of the other strip and will thus allow the strips to be brought as close together as possible, the wires of one strip interfering in no way with the wires of the other.

The side, top and bottom structural elements of scoop I are formed as shown in Figure 10, each carrying the wires $n$ so positioned that they extend obliquely to the rear, as shown in Figure 7$^a$. In this figure, the parts bearing the reference character N are constructed in accordance with the details set forth in Figure 10. It will appear, however, that such a construction could not be employed to advantage at corners, and, accordingly, in Figures 11 and 12, I have shown the corner construction, wherein the netting O is constructed of wires $o$ bound between two strips $o'$ riveted or bolted together as before, but each wire $o$ extends both laterally and downwardly beyond the edges of the strip with which is cooperates and is bent at substantially right angles. Moreover, it is seated in a notch $o^3$ in one of the cooperating strips $o'$ to maintain the oblique position of said wire as shown. When the strips $o'$ are bolted or riveted together by bolts or rivets $o^2$, the wires are clamped tightly between said strips and form a corner construction for the scoop. In Figure 7$^a$, the parts constructed in this manner bear the reference character O. Slight modifications in the placement of the wires between the strips are availed of in different parts of the scoop for working out the invention under varying conditions, it being necessary at times to have the wires extending only in one direction, as at the forward edge of the scoop in Figure 7$^a$, where there are but very few wires shown as mounted on the forward upright, these wires extending in only one direction. However, from the explanation made, the changes necessary to the various environments will be obvious to those skilled in the art.

When a plurality of fish-bone screen elements of the character described are assembled as shown in Figure 7$^a$, with all of the wires extending obliquely to the rear, and with the free ends of the wires of one element free from engagement with the contiguous ends of the wires of the adjacent elements, seaweed or other similar material will not catch on the wires, but will be caused, by the rapid passage of the scoop through the water, to travel along the wires to their ends and then float free. Moreover, a screen constructed in the manner described produces minimum resistance in passing through the water because of the flowing lines of the construction. The lateral, upper and lower sides of the scoop are constructed as described so that minimum resistance is offered to the passage of the scoop through the water, and yet the walls of said scoop are so formed that fish, passing through the forward open end thereof, cannot escape through the walls of the scoop, but are caused to pass through the rear open end thereof.

Communicating with the rear open end of the scoop is a conveyor belt P, the lower end of which passes about a directional roller $p$ mounted on the scoop, and the upper end of which passes about a similar roller $p'$ mounted preferably aft of the boat. This conveyor is guided intermediate the rollers $p$, $p'$ by spaced idlers $p^2$ mounted on side guides $p^3$ positioned at either side of the conveyor (see Figures 7 to 9, inclusive). The conveyor belt is, in its preferred form, constructed from two endless sprocket chains $p^4$ which run over sprockets at the opposite ends of rollers $p$, $p'$, said sprocket chains being connected by rods $p^5$ which form the conveying surface. Roller $p'$ is driven and, through the associated sprocket, imparts movement to the conveyor. The fish caught within the scoop and passing through the open rear end thereof are transported by the conveyor upwardly and over the upper end thereof and fall upon a second conveyor Q constructed in the same manner as conveyor P and similarly driven. Conveyor Q delivers the fish to the main deck B somewhat aft and in a position where they may be sorted or otherwise disposed of by the boat's crew. If desired, conveyor Q may deliver the fish onto conveyors operating above the main deck for the purpose of distributing the "catch" to various parts of the boat for storage or other disposal.

In order that the fish, in travelling up the conveyor, may not escape from the sides thereof, the sides of said conveyor are "fenced in" by a netting construction similar to that described with reference to the scoop. However, as the scoop is adapted to be raised or lowered, the netting at the sides of the conveyor is, preferably, so formed as to be vertically collapsible to such degree as to allow of this movement of the scoop.

The side rails or guides $p^3$ are rigidly secured at their forward lower ends to the skeleton frame of the scoop, and at their rear or outer ends are pivoted on the shaft which supports the roller $p'$. Accordingly, pivotal movement of the scoop results in a simultaneous similar movement of said side rails $p^3$ and the conveyor associated therewith. Intermediate the ends of each side rail $p^3$ is pivoted the upper rail R of one network side. Rails R extend to the rear end of the scoop, as shown in Figure 7, and are preferably made either of material which floats, such as wood, or are suitably pontooned, so that they will normally seek to rise to the surface of the water. To side rails R, and intermediate the ends of each, are pivoted lower rails R' which are connected near their free ends to the upper rails R through a lazy-tongs connection comprising the links $r$, $r'$ and $r^2$ (see Figures 1 and 7$^a$). Obliquely extending wires, corresponding to the wires $n$ and $o$, are carried by rails R R' and links $r$, $r'$ and $r^2$, as shown in Figures 1 and 7$^a$, so as to enclose the sides of the conveyor, for substantially its lower half, with a netting similar to that described with reference to the sides of the scoop. The upper half of the conveyor is closed at its sides by wires carried by a link S, pivoted at its upper end to the hull of the boat, as at $s$, and at its lower end to the top rail R, as at $s'$.

With this construction, it will appear that, as the top rail R is buoyant and has a tendency to float, the wire mesh suspended therefrom through the links and rails, as described, will normally be extended when the scoop is in the depressed or lowered position shown in Figure 1. However, the raising of the upper rail R is limited by restraining links $s^2$ (see Figure 1), so that the lower edges of the side screen walls will not become elevated sufficiently to draw away from the guides $p^3$ and allow the fish to escape through the intervening space. When the scoop is elevated to the dotted line position of Figure 1, the side screen walls of the conveyor will telescope downwardly, as the conveyor is raised, in a manner which will be manifest.

When operating in shallow waters, it is possible that the forward lower edge of the scoop may come into engagement with the ocean-bed, and, if means were not provided to preclude the digging in of the forward edge of the scoop, breakage of the same would undoubtedly result. For this reason, said edge of the scoop is provided with forwardly extending arms $t$, carrying large wheels or rollers T adapted to ride along the ocean-bed and maintain the forward edge of the scoop free from engagement therewith. Moreover, the forward lower edge of the scoop is provided with forwardly extending, pivoted fingers $t'$ (see Figures 1, 5 and 7$^a$), the free ends of which fingers are turned up to form skids adapted to traverse the ocean-bed. Each finger is provided with a wheel $t^2$, for facilitating the travel of said finger, and with laterally and rearwardly extending fish-bone netting, the function of which is to preclude fish from darting beneath the lower edge of the scoop and assure their being caught in said scoop. Through the employment of the wheels T and $t^2$, the necessity of continually sounding to ascertain depth, with the constant fear that a shoal, if encountered, would result in the disabling of the scoop, is obviated, since, if a shoal be met with, said wheels will preclude the forward end of the scoop from digging thereinto and will automatically bring about a slight elevation of the scoop until the obstruction is passed.

In deep-sea fishing, fish of unusual dimensions are apt to be encountered, and, if a fish of sufficient size be caught within the scoop, it is possible that its dimensions would be too great to pass through the open rear end thereof and along the conveyor, with the result that the discharge end of the scoop might become choked. In order to obviate this, the skeleton frame of the scoop is provided with a plurality of inwardly projecting knives U, the edges of which are made very keen. Through the employment of these knives, large fish, after entering the scoop, will be literally cut to pieces and transported in such dismembered form to the deck of the vessel by the conveyor.

Because of the seaworthiness of the boat, as described, and the manner of manipulating the scoop, a vessel embodying this invention is particularly adapted for deep-sea fishing and may go on an extended cruise far from land. This has heretofore been considered impractical because of the crude manner in which it was required to handle the nets. The scoop of the present invention may be made of considerable dimensions so that, when the boat is travelling along at a fair rate of speed, all the fish within the path of the front of the scoop will be collected thereby and elevated by the conveyor to the deck of the boat.

Long experience as a fisherman and a study of the habits of fish have led to the conception of an improved method of fishing at night, which I carry out by mounting upon the boat one or more powerful searchlights V (see Figures 1 and 2), which are so positioned that their rays play upon the surface of the water in front and in the path of the boat. The rays of light, being projected forwardly, diverge so that the beam becomes broader as it extends farther forward of the boat. On a dark night, this beam may extend with considerable brilliancy for several miles, illuminating the surface of the water for that distance with a cone-shaped glow, at the apex of which is the boat. It is well known that fish will come toward a light at night and will, therefore, be attracted by the light and enter the cone-shaped illuminating zone. As the boat moves forward, the width of the cone at any one point forward of the boat will become narrower, so that fish at this point, in keeping within the lighted zone, will come closer together and, by the time the boat is substantially upon them, they will have been drawn within the dimensions of the open front of the scoop. The lamps V are preferably so positioned that the scoop is not illuminated the rays striking the water just forward of the forward end of the scoop. By the time the boat has come near enough to the fish immediately forward thereof that the light is carried beyond said fish, the scoop will immediately surround them and their escape will be impossible.

In this manner, fish throughout a large area are drawn together by the converging light and are herded directly in the path of the scoop. The lamps V may be positioned at various angles or may be so placed that their rays cross for the purpose of giving maximum divergency and breadth to the beam. This manner of directing fish into the zone of operation of the boat constitutes an improved method of fishing at night which is described and claimed in my copending application Serial No. 420,122, filed October 28, 1920.

Having thus fully described the invention, what I claim as new, and desire to secure by Letters Patent, is:

1. In a fishing boat, a submersible fish-collecting net pivoted to the boat, a plurality of hollow masts for receiving weights for counterbalancing the fish-collecting net, weights in said masts co-operating with cables attached to the fish-collecting net for counter-balancing said net, in combination with a plurality of hulls, means for propelling the boat in the direction of its length and means for propelling the boat laterally.

2. In a fishing boat, a submersible fish-collecting net pivoted to the boat and between the hulls, hollow masts for receiving weights for counterbalancing the fish-collecting net, weights in said masts co-operating with cables attached to the fish-collecting net for counter-balancing said net, in combination with a plurality of channel-shaped hulls and adjustable twin paddle wheels for driving the boat forwardly and laterally.

3. In a fishing boat, a plurality of hulls, a fish-collecting net pivoted between the hulls, means for regulating the extent to which said net is submerged, in combination with means, positioned on the boat and above the net, for projecting a powerful light a comparatively long distance in advance of said net.

4. In a fishing boat, a plurality of hulls positioned in spaced relation beneath a common deck, a propelling device positioned between each two adjacent hulls, in combination with a fish-collecting net pivoted to the boat, means for counterbalancing the weight of said net and means, positioned on the boat and above the net, for powerfully illuminating the water in advance of the boat and in alignment with the net so as to attract fish within the path of said net.

5. In a fishing boat, a plurality of hulls in spaced relation below the common deck, a submersible fish collecting scoop positioned forwardly of the boat and provided with rearwardly extending booms pivoted to the boat between the hulls, and means for supporting the scoop at the desired submersion.

6. In a fishing boat, a plurality of hulls, a submersible fish-collecting scoop pivoted to the boat and between the hulls, said scoop having walls composed of a plurality of sections of fish-bone netting, each section of which is provided with laterally and rearwardly extending spaced rods, in combination with means for propelling the boat forwardly and laterally.

7. In a fishing boat, a plurality of hulls, a submersible fish-collecting scoop pivoted to the boat and between the hulls, said scoop having walls composed of a plurality of sections of fish-bone netting, each section of which is provided with laterally and rearwardly extending spaced rods, means associated with the forward end of the scoop for precluding the same from digging into the sea bottom when the boat is in shallow water, means for delivering the fish from the net to a point within the boat, and means for counterbalancing the scoop.

8. In a fishing boat, a plurality of hulls, a submersible fish-collecting scoop pivoted to the boat and between the hulls, said scoop having walls composed of a plurality of sections of fish-bone netting, each section of which is provided with laterally and rearwardly entending spaced rods, means associated with the forward end of the scoop for precluding the same from digging into the sea-bottom when the boat is in shallow water, means for delivering the fish from the net to a point within the boat, and means co-operating with said delivering means for automatically cutting large fish so as to preclude their clogging effect.

9. In a fishing boat, a plurality of hulls, a submersible fish-collecting scoop pivoted to the boat and between the hulls, said scoop having walls composed of a plurality of sections of fish-bone netting, each section of which is provided with laterally and rearwardly extending spaced rods, means associated with the forward end of the scoop for precluding the same from digging into the sea-bottom when the boat is in shallow water, and rollers co-operating with the forward end of the scoop.

10. In a fishing boat, a plurality of channel-shaped hulls, a fishing scoop pivoted between the hulls, said scoop embodying walls composed of a plurality of sections of fish-bone netting, hollow masts containing weights, cables co-operating with the weights and scoop for counterbalancing the latter, said masts having open bottoms whereby the weights may extend into the water and means for propelling the boat in the direction of its length and laterally.

11. A fishing boat embodying a plurality of hulls, a fish collecting scoop pivoted between the hulls and normally submerged below the surface of the water, said scoop being foraminous and having an open forward end, and means for counterbalancing the scoop.

12. A fishing boat provided with a submersible scoop positioned forwardly of the boat and supported on the boat for pivotal movement so that its depth of submersion may be controlled, means for raising and lowering the scoop, a conveyor for conveying the fish from within the scoop to the interior of the boat, and collapsible walls positioned along the sides of the conveyor and extending rearwardly from the after part of the scoop to preclude the escape of fish being transported from the scoop by the conveyor, said collapsible walls being provided with buoyant members for maintaining the walls in distended condition when the scoop is submerged.

13. A fishing boat provided at its bow with a submersible scoop pivoted to the boat, and means for counterbalancing the scoop embodying a weight, said weight being operatively connected to the scoop and mounted to slide in a substantially vertical guide-way open at its bottom to the sea, whereby in the event of accidental release of the weight, the weight will fall into the sea without damage to the boat.

14. A fishing boat provided at its bow with a submersible scoop and said boat having also a hollow mast provided with an interior passage open at its bottom to the sea, a weight suspended within the hollow mast on a flexible connection secured to the scoop for the purpose of counterbalancing the weight of the scoop whereby, in the event of breakage of the flexible connection, the weight will fall through the hollow passage into the sea without damage to the boat.

15. A fishing boat provided at its bow with a submersible fish collecting scoop, a line secured to the scoop, passed over directional sheaves and secured at its opposite end to a weight for counterbalancing the scoop, said weight being suspended above the water in such manner that in the event of breakage of the line, the weight will fall into the sea without injurying the boat.

16. A fishing boat embodying a plurality of keels positioned below a common deck, a submersible fish collecting scoop at the bow of the boat, and a weight for counterbalancing the scoop, said weight being suspended above an opening in the deck between two adjacent hulls, whereby in the event of the weight breaking loose, it is adapted to fall freely into the sea without damaging the boat.

17. A fishing boat provided at its bow with a submersible fish collecting scoop formed with a closed bottom and rigid throughout, means for conveying the fish caught within the scoop to a point within the boat, and at least one skid projecting beyond the forward end of the scoop and carried by the scoop to preclude the scoop from damage through contact with submerged objects or uneven sea bottom.

18. A fishing boat provided at its bow with a submersible fish collecting scoop formed with a closed bottom and rigid throughout, means for conveying the fish caught within the scoop to a point within the boat, at least one skid projecting beyond the forward end of the scoop and carried by the scoop to preclude the scoop from damage through contact with submerged objects or uneven sea bottom, and a roller associated with the skid.

19. A fishing boat provided at its bow with a submersible scoop from the forward edge of which project guiding means adapted to engage with the sea bottom when the boat is in relatively shallow water, the forward lower edge of the scoop being further provided with forwardly and downwardly extending means to direct fish into the scoop and preclude their escape between the lower edge of the forward end of the scoop and the seat bottom when the guiding means is in engagement with the seat bottom.

20. A fishing boat provided at its bow with a submersible scoop having an open forward end for collecting fish in the path of the boat, means for conveying fish, collected within the scoop, into the interior of the boat, and means positioned on the boat above the scoop and at all times above the surface of the water for projecting a fan shaped ray of light on to the surface of the water for a distance forwardly of the boat for the purpose of attracting and lining up fish into the path of the boat and simultaneously lighting the way thereof.

21. A fishing boat provided at its bow with a submersible net for collecting fish in the path of the boat, powerful light projecting means carried by the boat and at all times above the surface of the water to project a fan-like ray of light on the surface of the water for a distance forwardly of the boat for attracting and lining up fish in the path of the net, and automatic means for conveying the fish from the net to a point within the boat.

22. A fishing boat embodying a plurality of hulls, a fish collecting scoop pivoted between the hulls and normally submerged below the surface of the water, said scoop being foraminous and having an open forward end, and means for supporting the scoop at the desired submersion, in combination with means, positioned on the boat and above the surface of the water at all times for projecting a fan like ray of light on to the surface of the water for an appreciable distance forwardly of the boat for the purpose of attracting fish into the path of the boat and simultaneously lighting the way thereof, and means for conveying the fish collected within the scoop to a point within the interior of the boat.

23. A fishing boat provided at its bow with a submersible fish collecting scoop formed with a foraminous bottom and rigid throughout, said scoop being pivotally secured to the boat substantially amidships, and means for conveying the fish caught within the scoop to a point within the boat.

24. A fishing boat provided at its bow with a submersible fish collecting scoop closed at its top and bottom for its entire length and provided with foraminous walls converging in a rearward direction, and means for conveying fish caught in the scoop from the rear end of the scoop to a point within the boat.

25. A fishing boat carrying and supporting a funnel shaped fish collecting scoop adapted to be completely submerged and having foraminous top, bottom and side walls extending the entire length of the scoop, and a mechanical conveyor extending from a point within the boat to a point beneath and exteriorly of the boat and there associated with the discharge end of the scoop, whereby fish collected in the scoop may be conveyed into the boat.

26. A fishing boat provided at its bow with a submersible fish collecting device for collecting fish in the path of the boat, powerful light projecting means cooperating with the fish collecting device, and positioned above the surface of the water, to project rays of light on to the surface of the water for a distance forwardly of the fish collecting device while said device is in operation, for the purpose of attracting and lining up fish in the path of such device.

27. A fishing boat provided at its bow with a submersible fish collecting device for collecting fish in the path of the boat, powerful light projecting means cooperating with the fish collecting device, and positioned above the surface of the water, to project rays of light on to the surface of the water for a distance forwardly of the fish collecting device while said device is in operation for the purpose of attracting and lining up fish in the path of such device, and means also cooperating with the fish collecting device for conveying the fish caught to a place of delivery aboard the boat.

28. A fishing boat supporting and carrying a fish collecting scoop provided with rigid bottom, top and side walls and open at its front and rear ends, said scoop being normally supported from the boat in a position forwardly of the boat and below the surface of the water, and a mechanical conveyor extending from the open rear end of the scoop to a point within the boat substantially amidships, so as to convey the fish caught within the scoop to the interior of the boat.

In testimony whereof I have signed my name to this specification.

NELS A. LYBECK.